(12) United States Patent
Matlin et al.

(10) Patent No.: US 9,737,842 B2
(45) Date of Patent: Aug. 22, 2017

(54) AIR PURIFIER WITH INTELLIGENT SENSORS AND AIRFLOW

(71) Applicant: Fellowes, Inc., Itasca, IL (US)

(72) Inventors: Tai Hoon K. Matlin, Round Lake Beach, IL (US); Shawn Michael Applegate, Wood Dale, IL (US)

(73) Assignee: FELLOWES, INC., Itasca, IL (US)

( * ) Notice: Subject to any disclaimer, the term of this patent is extended or adjusted under 35 U.S.C. 154(b) by 199 days.

(21) Appl. No.: 14/262,111

(22) Filed: Apr. 25, 2014

(65) Prior Publication Data

US 2015/0306533 A1 Oct. 29, 2015

(51) Int. Cl.
*B01D 46/46* (2006.01)
*B01D 46/44* (2006.01)
*F24F 3/16* (2006.01)
*F24F 11/00* (2006.01)

(52) U.S. Cl.
CPC ........... *B01D 46/46* (2013.01); *B01D 46/448* (2013.01); *F24F 3/16* (2013.01); *F24F 3/1603* (2013.01); *F24F 11/0012* (2013.01); *F24F 11/0034* (2013.01); *F24F 2011/0064* (2013.01); *F24F 2011/0067* (2013.01)

(58) Field of Classification Search
CPC combination set(s) only.
See application file for complete search history.

(56) References Cited

U.S. PATENT DOCUMENTS

| 4,828,586 | A | 5/1989 | Joannou |
| 6,884,399 | B2 | 4/2005 | Reisfeld et al. |
| 7,166,259 | B2 | 1/2007 | Beam et al. |
| 7,226,496 | B2 * | 6/2007 | Ehlers .................... B01D 53/32 454/237 |

(Continued)

FOREIGN PATENT DOCUMENTS

| CN | 203231470 U | 10/2013 |
| CN | 203385149 U | 1/2014 |

(Continued)

OTHER PUBLICATIONS

International Search Report and Written Opinion mail Jul. 20, 2015 in International Application PCT/US2015/027287.

(Continued)

*Primary Examiner* — Amber R Orlando
*Assistant Examiner* — Sonji Turner
(74) *Attorney, Agent, or Firm* — Pillsbury Winthrop Shaw Pittman LLP

(57) ABSTRACT

An air purifying device includes an air purifier mechanism, a controller, and a sensing device configured to detect one or more conditions in a predetermined area proximate the air purifying device. The controller is configured to receive an input to select one of the predetermined operational settings to govern the operation of the air purifier mechanism. The air purifier mechanism is configured to operate in at least one of a plurality of modes of operation in each of its predetermined operational setting. The controller is configured to change modes of operation of the air purifier mechanism (Continued)

from a first mode of operation to a second mode of operation in response to its sensing device detecting a change in said one or more conditions in the predetermined area and based on the selected predetermined operational setting.

35 Claims, 12 Drawing Sheets

(56) References Cited

U.S. PATENT DOCUMENTS

| | | | |
|---|---|---|---|
| 7,831,932 B2 | 11/2010 | Josephsoon et al. | |
| 8,876,940 B2 * | 11/2014 | Innes | F24F 3/16 454/229 |
| 2004/0194484 A1 * | 10/2004 | Zou | F24F 3/0442 62/186 |
| 2006/0112828 A1 * | 6/2006 | Ehlers | B01D 53/32 96/63 |
| 2009/0229469 A1 | 9/2009 | Campbell et al. | |
| 2010/0288468 A1 * | 11/2010 | Patel | B01D 46/10 165/59 |
| 2012/0022700 A1 * | 1/2012 | Drees | G05B 15/02 700/276 |
| 2012/0180655 A1 * | 7/2012 | Law | F24F 3/1603 95/1 |
| 2012/0312169 A1 | 12/2012 | Chan et al. | |
| 2012/0324928 A1 | 12/2012 | Durham et al. | |
| 2013/0173064 A1 * | 7/2013 | Fadell | G05D 23/1902 700/276 |
| 2013/0268124 A1 * | 10/2013 | Matsuoka | G05B 15/02 700/276 |
| 2013/0268125 A1 * | 10/2013 | Matsuoka | G05D 23/1905 700/276 |
| 2014/0069131 A1 * | 3/2014 | Masui | F24F 11/0034 62/180 |

FOREIGN PATENT DOCUMENTS

| | | | | |
|---|---|---|---|---|
| EP | 2236951 A1 | | 10/2010 | |
| EP | 2476968 A1 | | 7/2012 | |
| JP | WO 2009081545 A1 | * | 7/2009 | ............ F24F 1/0007 |
| JP | EP 2236951 A1 | * | 10/2010 | ............ F24F 1/0007 |

OTHER PUBLICATIONS

BioGS 2.0 Ultra Quiet HEPA Air Purifier, http://www.rabbitair.com/biogs-2-ultra-quiet-hepa-air-purifier.aspx, downloaded on Apr. 25, 2014.
BioGS Owner's Manual (Models SPA-421A and SPA-582A), 2010.
Mobile Hospital Air Purification, http://biologicalcontrols.com/800400.shtml, downloaded on Apr. 25, 2014.
Intelligent Purification, RabbitAir, http://www.rabbitair.com/inteligent-purification.aspx, downloaded Apr. 25, 2014.
Maier Bio-HEPA Hybrid Air Purifier MHI-6800, http://www.maier.sg/airpurifiers/MHI-6800.html, downloaded Apr. 25, 2014.
MinusA2 Asthma and Allergy Friendly Edition HEPA Air Purifier, http://www.rabbitair.com/minusa2-asthma-and-allergy-friendly-edition-air-purifier.aspx, downloaded Apr. 25, 2014.
International Preliminary Report on Patentability mailed on Aug. 2, 2016 in International Application No. PCT/US2015/027287.
Written Opinion of the International Preliminary Examining Authority mailed Mar. 31, 2016 in International Application PCT/US2015/027287.

* cited by examiner

AIR PURIFIER WITH INTELLIGENT SENSORS AND AIRFLOW

BACKGROUND

Field of the Invention

The present patent application relates to air purifiers. Specifically, the present patent application relates to an air purifying system having sensors and controllers to monitor and control the operation of the air purifying system.

Description of Related Art

Airborne dust and allergens such as pollen, mold spores, pet dander, and micro-organisms (e.g., germs and bacteria) may affect the health of persons breathing the air. Air purifiers are well known devices that are used in interior spaces such as homes and commercial public spaces for providing fresh air by removing odors, dust, allergens and other airborne pollutants from the interior air.

The air purifier generally includes a housing with an air inlet and an air outlet. The air inlet is configured to receive ambient air and the air outlet is configured to deliver purified air into the interior space. The housing provides an airflow path from the air inlet to the air outlet. The housing also includes an air filtering system, a fan and a drive mechanism. The air filtering system is provided in the airflow path for filtrating contaminants present in ambient air passing therethrough. The fan is configured to move the air through the airflow path between the air inlet and the air outlet. The drive mechanism (e.g., a motor) is configured to provide power to draw air into the air inlet, to draw air through the airflow path and to exhaust purified air out of the air outlet.

The present patent application endeavors to provide various improvements over known air purifying systems.

BRIEF SUMMARY

In one embodiment of the present patent application, an air purifying system is provided. The air purifying system includes a plurality of air purifiers each having a controller and a sensing device. Each sensing device is configured to detect one or more conditions in a predetermined area proximate its respective air purifier. Each of the plurality of air purifiers is configured to operate in at least one of a plurality of modes of operation. The controller is configured to change modes of operation of its air purifier from a first mode of operation to a second mode of operation in response to its sensing device detecting a change in said one or more conditions in the predetermined area. Each of said air purifiers includes one or more communication devices coupled to the controller thereof for establishing communication between the controllers of said air purifiers. Each of said controllers is further configured to transmit a control signal to each other controller via said communication device in response to its sensing device detecting said change. Each controller is further configured to change to said second mode of operation in response to receiving said control signal.

In another embodiment of the present patent application, an air purifying device is provided. The air purifying device includes an air purifier mechanism, a controller, and a sensing device. The air purifier mechanism is received in a housing. The housing provides an air flow path between an air inlet configured to receive ambient air and an air outlet configured to deliver purifier air. The air purifier mechanism includes an air purifying system, a fan and a drive mechanism. The air purifying system is disposed in the air flow path and is configured to remove contaminants present in the ambient air passing through the housing, the drive mechanism is configured to drive a fan at variable speeds so as to move the air through the air flow path between the air inlet and air outlet. The controller has a plurality of predetermined operational settings to govern operation of the air purifier mechanism. The controller is configured to receive an input to select one of the predetermined operational settings to govern the operation of the air purifier mechanism. The sensing device is configured to monitor one or more conditions in a predetermined area proximate the air purifying device so as to detect presence or movement of an object in the predetermined area. The air purifier mechanism is configured to operate in at least one of a plurality of modes of operation in each of its predetermined operational setting. The controller is configured to change modes of operation of the air purifier mechanism from a first mode of operation to a second mode of operation in response to its sensing device detecting the presence or movement of the object in the predetermined area and based on the selected predetermined operational setting.

Other aspects, features, and advantages of the present invention will become apparent from the following detailed description, the accompanying drawings, and the appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION OF THE DRAWINGS

Figure 1:
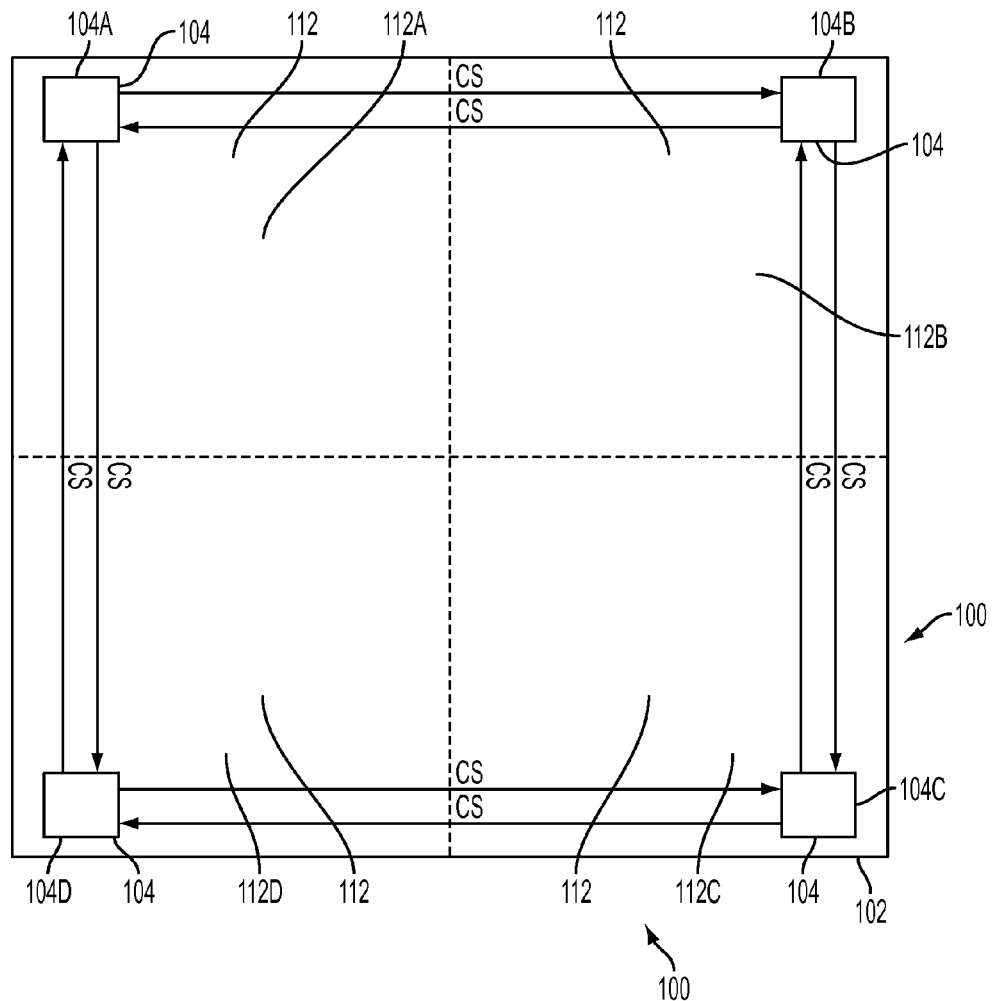
FIG. 1 shows a block diagram of an exemplary air purifying system having a plurality of air purifiers in accordance with an embodiment of the present patent application.
Figure 2:
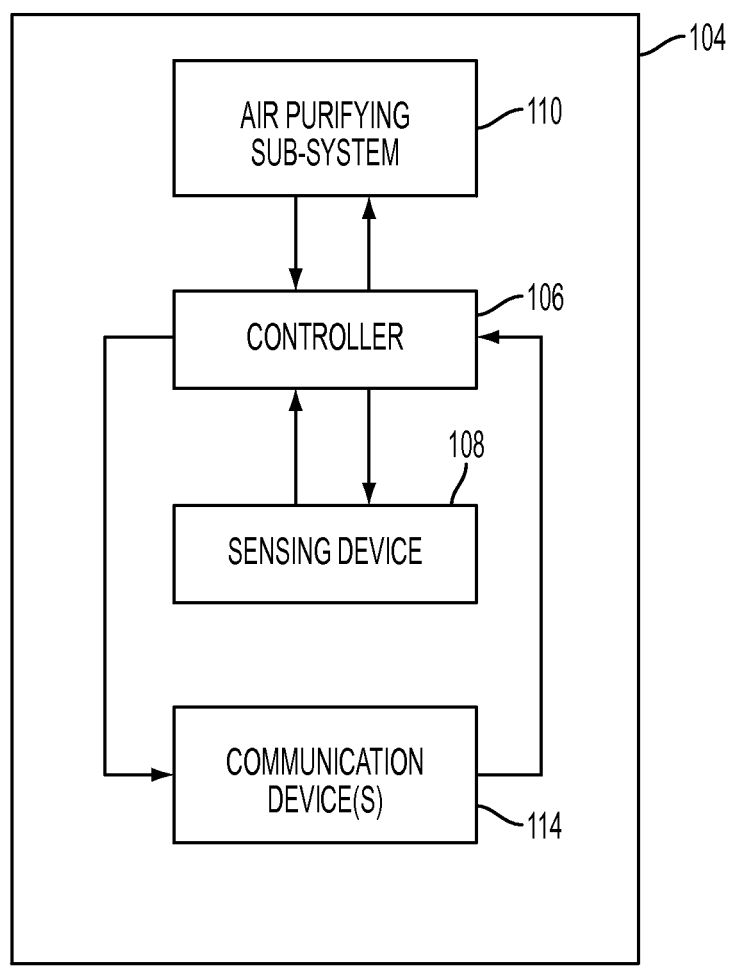
FIG. 2 shows a block diagram of an exemplary air purifier of the air purifying system in accordance with an embodiment of the present patent application.

Referring to FIGS. 1 and 2, the present patent application provides an air purifying system 100 that includes a plurality of air purifiers 104, 104A-D. Each air purifier 104, 104A-D includes a controller 106 and a sensing device 108. Each sensing device 108 is configured to detect one or more conditions in a schematically illustrated predetermined area 112, 112A-D proximate its respective air purifier 104, 104A-D. Each of the plurality of air purifiers 104 is configured to operate in at least one of a plurality of modes of operation. The controller 106 is configured to change modes of operation of its air purifier 104 from a first mode of operation to a second mode of operation in response to its sensing device 108 detecting a change in the one or more conditions in the predetermined area 112. Each of the air purifiers 104 comprises one or more communication devices 114 coupled to the controller 106 thereof for establishing communication between the controllers 106 of the air purifiers 104. Each of the controllers 106 is further configured to transmit a control signal CS to each other controller 106 via the communication device 114 in response to its sensing device 108 detecting the change. Each controller 106 is further configured to change to the second mode of operation in response to receiving the control signal CS.

Referring to FIG. 1, the air purifiers 104, 104A-D of the air purifying system 100 are positioned or installed in a targeted zone 102. The targeted zone 102, herein, refers to a defined closed space or a defined semi-closed space. For example, the targeted zone 102 may include public areas with an enclosed environment such as restrooms, schools, healthcare facilities, industrial spaces, office spaces, break rooms, cafeterias, warehouses, common rooms, other commercial spaces (e.g., restaurants, hotels, entertainment lounges), etc. The targeted zone may also be a sub-section of a larger space, such as a set of office cubicles or like.

In the illustrated embodiment, as just one example is shown in FIG. 1, the air purifying system 100 may include four air purifiers 104A-D located at spaced apart locations in the targeted zone 102. However, the number of air purifiers 104 in the air purifying system 100 can vary significantly in number based on the requirements of the user. Also, the positioning of the air purifiers in FIG. 1 is exemplary and should not be construed to be limiting in anyway. The air purifiers 104 may generally be spaced-apart from one another by a predetermined distance such that each air purifier 104 is configured to purify air in a designated area within the targeted zone 102. Such designated areas may or may not overlap with each other. The designated areas may generally surround their respective air purifier. The air purifiers may also be randomly spaced.

The air purifier 104 of the air purifying system 100 may be configured to detect the presence of other air purifier(s) within its given proximity and within the targeted zone 102. For example, using Infrared (IR) emitters and receivers or other wired or wireless signal systems (e.g., Near Field Communication (NFC), Local Area Network (LAN), Wireless Local Area Network (WLAN), Bluetooth, RF, Wi-Fi etc.), other air purifiers 104 within a given proximity of the air purifier 104 are detected so as to allow one of the air purifiers 104 to be designated as the master and the other subsequent air purifiers 104 to be designated as the slaves. This 'master-slave' arrangement of the air purifying system 100 allows for simple control of multiple air purifiers 104 within a given environment. For example, the air purifier 104 recognizes the presence of other air purifiers 104 and coordinates the controllers 106 to work together to optimally clean the air in the targeted zone 102.

The air purifiers 104 may also be linked to a separate computer device, by a wired and a wireless means, so as to coordinate the air purifying efforts of the air purifiers 104 as well as to notify and communicate when service or maintenance is needed by one, any or all the air purifiers in communications with one another.

The air purifier 104 may have a generally oblong or rectangular shape or configuration. The air purifier 104 has a width dimension that may generally range from about 12.05 inches to about 37.9 inches, a height dimension that may generally range from about 17.5 inches to about 23.82 inches, and a depth or thickness dimension that may generally range from about 6.38 inches to about 8.8 inches. In one embodiment, the air purifier 104 has a width or thickness dimension that may generally be about 34.45 inches, a height dimension that may generally be about 21.65 inches, and a depth dimension that may generally be about 7.99 inches. In another embodiment, the air purifier 104 has a width or thickness dimension that may generally be about 13.39 inches, a height dimension that may generally be about 20.67 inches, and a depth dimension that may generally be about 7.09 inches. However, it is contemplated that the air purifier 104 may have other shapes or configurations that would be appreciated by a person skilled in the art. The air purifier 104 may generally weigh from about 30 pounds to about 38 pounds. In one embodiment, the air purifier 104 may generally weigh about 34 pounds.

The air purifier 104 is generally configured to purify air in spaces or targeted zones having an area from about 279 square feet to about 682 square feet. In one embodiment, the dual air channel unit air purifier is generally configured to purify air in spaces or targeted zones having an area of about 620 square feet. In one embodiment, the single air channel unit air purifier is generally configured to purify air in spaces or targeted zones having an area of about 310 square feet.

The air purifier 104 is generally configured to provide purified air at a Clean Air Delivery Rate (CADR) ranging from about 198 CADR to about 484 CADR. In one embodiment, the air purifier is generally configured to provide purified air at 440 CADR. In another embodiment, the air purifier is generally configured to provide purified air at 220 CADR. The air purifier 104 is generally configured to provide air flow rate ranging from about 194 Cubic Feet per Minute (CFM) to about 460 CFM. In one embodiment, the air purifier is generally configured to provide air flow rate at 430 CFM. In another embodiment, the air purifier is generally configured to provide air flow rate at 215 CFM.

The air purifier 104 is generally has noise levels ranging from about 27 decibels (dB) to about 40 dB, when the fan is running on a low speed and from about 59 dB to about 77 dB, when the fan is running on a high speed. In one embodiment, the air purifier is generally has noise level of about 35 dB, when the fan is running on a low speed and of about 70 dB, when the fan is running on a high speed. In another embodiment, the air purifier is generally has noise level of about 30 dB, when the fan is running on a low speed and of about 65 dB, when the fan is running on a high speed.

Figure 3:
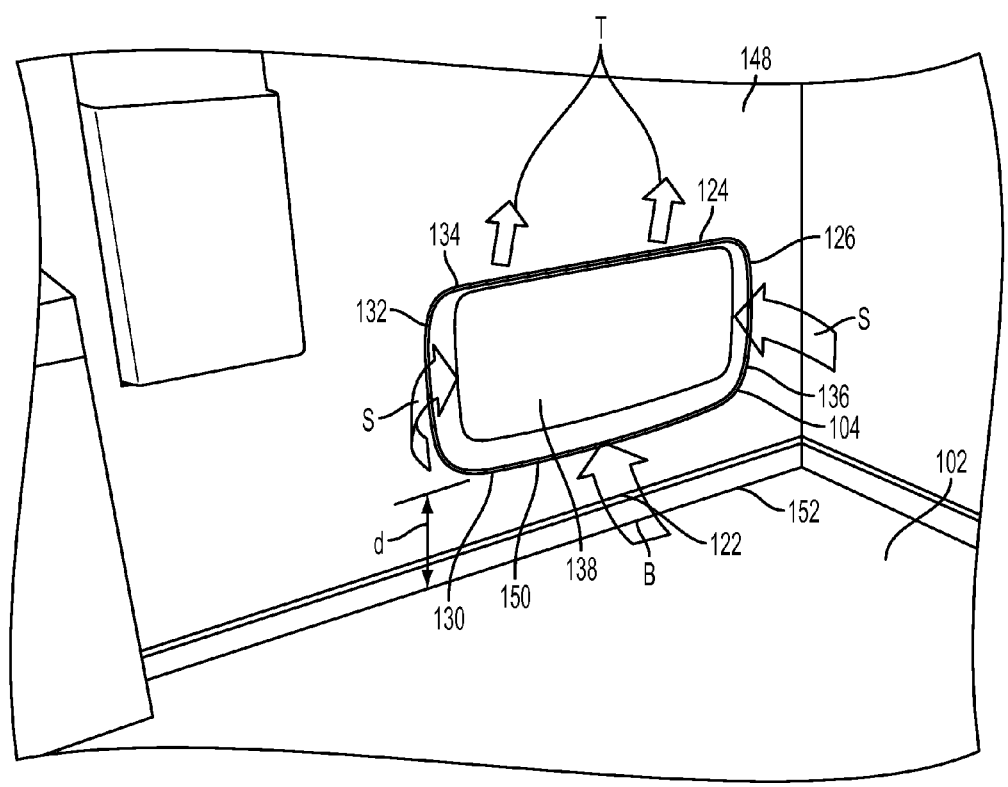
FIG. 3 shows the air purifier of the air purifying system being mounted on a wall of a targeted zone in accordance with an embodiment of the present patent application.

As shown in FIG. 3, the air purifier 104 may be constructed and designed to be mounted on a vertical surface like a wall 148 of the targeted zone 102 so that the air purifier 104 does not take up the floor space. The air purifier 104 may be mounted on the wall 148 using a bracket member (not shown) and one or more fastening members (not shown) for mounting the bracket member to the wall 148. As would be appreciated by a person skilled in the art, the bracket member and the air purifier's housing may each include cooperating mating structures that enable positioning and locking of the air purifier 104 on the bracket member. The air purifier 104 may be hardwired from the wall 148 allowing the air purifier 104 to be installed into commercial public areas such as restrooms where a corded unit is not allowed. In other embodiments, the air purifier 104 may be constructed and designed to be mounted on a horizontal surface of the targeted zone 102, such as the floor of the targeted zone 102 or the ceiling of the targeted zone 102.

The air purifier 104 may be mounted on the wall 148 such that a lowest point 150 of the air purifier 104 is positioned at a predetermined distance d above floor 152 of the targeted zone 102. The predetermined distance d (i.e., distance from the lowest point 150 of the installed air purifier 104 to the floor 152 of the targeted zone 102) may range between about 12 inches and about 15 inches.

Referring to FIG. 2, the air purifier 104 includes the sensing device 108, the one or more communication devices 114, the controller 106 and an air purifying sub-system 110.

The sensing device 108 of the air purifier 104 may be configured to determine traffic patterns of any object (person or other movable living things) within the predetermined area 112 proximate its respective air purifier 104. The controller 106 of the air purifier 104 may then be configured to respond to the determined traffic patterns of the object.

The sensing device 108 of the air purifier 104 may include a motion sensing device, a light sensing device, a laser sensing device, an audio sensing device, an Infrared (IR) beam sensing device, and/or any other sensing devices that are configured to detect one or more conditions in the predetermined area 112 proximate its respective air purifier 104. For example, the sensing device 108 of the air purifier 104 may be an audio sensing device capable of detecting flushing activity (e.g., when a toilet is flushed in a wash room), a door opening and closing noise, and traffic of any object (person or other movable living things) within the predetermined area 112 proximate its respective air purifier 104. The sensing device 108 of the air purifier 104 may be configured to detect other noise levels within the predetermined area 112 proximate its respective air purifier 104 as long as the noise levels, dB are significantly high enough to be detected and/or have a signature audio pattern.

The audio sensing device may first detect the noise level and the motion sensing device may then detect motion/activity related to the detected noise level over a certain amount of time. The controller of the air purifier 104 is configured to receive and respond to both the sound/noise signal from the audio sensing device and the motion signal detected by the motion sensing device. For example, the audio sensing device may detect the toilet flushing noise in the wash room and the motion sensing device may then detect that someone left the wash room. The controller of the air purifier 104 receives the signals from the both the audio sensing device and the motion sensing device and responds accordingly.

The sensing device 108 of the air purifier 104 generally includes transmitter and receiver that are capable of transmitting signals produced by a signal generator of the sensing device 108 and receiving back those same signals after they interacted with an object. As such, the sensing device 108 of the air purifier 104 acts as a proximity sensing device capable of detecting the presence of any object (person or other movable living things) within the predetermined area 112 proximate its respective air purifier 104.

The sensing device 108 of the air purifier 104 may be a manual switch. In the 'master-slave' arrangement of the air purifying system 100, if the manual switch of the 'master' air purifier is turned off, then the corresponding 'slaves' air purifiers are also turned off.

The sensing device 108 of the air purifier 104 may include an odor sensing device for detecting odor components in the targeted zone and a dust sensing device for detecting dust particles in the targeted zone.

The predetermined area 112 may be determined based on the number of air purifiers located in the targeted zone 102. For example, the predetermined area is larger when a smaller number of air purifiers 104 are located in the targeted zone 102 and the predetermined area is smaller when a larger number of air purifiers 104 are located in the targeted zone 102. The predetermined area 112 may also be determined by the operational performance of the air purifier 104. For example, the predetermined area is larger when the operational performance of the air purifier 104 is higher and the predetermined area is smaller when the operational performance of the air purifier 104 is smaller. The predetermined area 112 may also be specified by the user via a user interface. The predetermined area 112 may be the same area within the targeted zone in which the air purifier purifies the air.

The one or more conditions may include signatures or indicators associated with the presence of a person or other moveable living thing in the predetermined area 112. For example, the one or more elements (e.g., Infrared (IR) beam or audio) of the sensing device 108 are configured to sense the presence of a person via heat or sound generated by the person in the predetermined area 112. In case of the light or laser sensing device, if the light or laser beam extending from the transmitter towards a receiver is interrupted by a person, the signal missing at the receiver represents the presence of a person within predetermined area 112. The sensing device 108 may be sensitive to changes in radiation from within a field of view. The sensing device 108 may be configured to send pulses of ultrasonic waves (acoustic sound waves above the frequency that a human can hear) and measures the reflection off a moving object. The one or more conditions may include, for example, motion, light (visible or non-visible), radiation, temperature, acceleration, or other types of waves (e.g., Radio Frequency (RF) signals or sound waves) in the predetermined area 112. The motion, the audio, the light, the IR beam and/or any other sensing devices allow the air purifier 104 to monitor its noise output level, its power output level, its required CFM level by detecting the foot traffic around the air purifier at any given time (using a timer).

The air purifier 104 is configured to operate in at least one of a plurality of modes of operation. The plurality of modes of operation of the air purifier 104 of the air purifier may include a high performance mode, a quiet mode, and a power-off/sleep mode. The different modes of operation of the air purifier 104 may be invoked adaptively based upon a signal generated by the sensing device 108. The different modes of operation of the air purifier 104 may be invoked manually by the user via the user interface.

In the high performance mode, the air purifier 104 is programed to run the fan at a high speed so as to deliver highest purified air output (with the highest CFM output). The fan may be run at one or more different high speeds when the air purifier is in the high performance mode. The quiet or low CFM mode may have a reduced audible noise and has a lower airflow or purified CFM air output in comparison with the higher performance mode. The fan may be run at one or more different low speeds when the air purifier is in the quiet mode. The quiet mode may be a power saving mode of the air purifier.

The power-off/sleep mode may be configured to deactivate the air purifier 104. The fan and motor assembly may stop operating in the power-off/sleep mode. The power-off/sleep mode may be used during servicing or maintenance of the air purifier 104.

Any of the above-discussed modes of operation of the air purifier may be regarded as the first mode of operation, and any of the above-discussed modes of operation of the air purifier may be regarded as the second mode of operation. For example, in one embodiment, the high performance mode of operation may be referred to as a first mode of operation of the air purifier and the quiet or low CFM mode of operation may be referred to as a second mode of operation of the air purifier 104.

The controller 106 may include a control circuit. However, the controller 106 may alternatively include any other type of suitable controller without deviating from the scope of the present patent application. For example, the controller 106 may include a processor executing code; an integrated computer running a program; analog or digital circuitry; etc.

The air purifier 104 also may include a memory device connected to, or integral with, the controller 106 for storing information, such as, for example, determined cycles, patterns and usage flows of the air purifier 104. The memory device may also be configured to store other settings or parameters of the air purifier 104. The controller 106 may store information within the memory device and may subsequently retrieve the stored information from the memory device. The memory device may include any suitable type of memory, such as, for example, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory or any other suitable memory.

The air purifier 104 may include the user interface that is operatively connected to the controller 106 and is configured to display information (e.g., operational performance) of the air purifier to a user and/or solicit information as well as allow a user to enter data and/or other parameters of the air purifier. The user interface may allow a user to modify one or more parameters of the air purifier. For example, the user interface may be display such as a graphical display. The display may be a touch screen display or a liquid crystal display (LCD) display. Also, the user interface may include one or more buttons or other controls that allow a user to modify one or more parameters of the air purifier. For example, the one or more buttons or other controls of the user interface may be operated by touch or tactile manipulation or mechanical type control.

The controller 106 is configured to receive a signal from the sensing device 108 indicating presence or absence of an object (person) in the predetermined area 112 proximate its respective air purifier 104. The controller 106 is then configured to change the modes of operation of its air purifier 104 from the first mode of operation to the second mode of operation when the presence of an object (person) in the predetermined area 112 proximate its respective air purifier 104 is detected. The user, via the user interface, may designate the quiet mode or the power-off/sleep mode as the second mode of operation based on the noise level desired within the targeted zone 102.

The controller 106 is configured to continue the high performance mode of operation when the presence of an object (person) in the predetermined area 112 proximate its respective air purifier 104 is not detected. The ability to detect the presence or absence of an object (person or other movable living objects) allows the air purifier 104 to function in its high performance airflow mode or high output mode. For example, when it detected or determined that there is no one within proximity of the air purifier 104 or that the targeted zone 102 containing the air purifiers 104 is empty, the air purifier 104 continues to operate in its high output mode to clean fast and efficiently as quickly as possible without any disturbance to the user(s). That is, in the high output mode, the air purifier 104 may be programed to run the fan at a high speed with the highest CFM output since the higher noise level is not be heard by anyone. This allows the air purifier 104 to purify the air faster over time.

Due to the ability to monitor foot traffic, the air purifier 104 is configured to detect when to operate in a high output mode (or high performance airflow flow mode) to clean the air quickly and efficiently and when to operate in its quiet, low output mode or power-off/sleep mode so as not to disturb people within proximity of the air purifier 104.

Also, due to the ability to monitor foot traffic (the presence of a person or persons instantaneously and over time), the controller 106 of the air purifier 104 is configured to determine actual needed usage in combination with a person's proximity and room's usage pattern so as to gauge when a filter needs replacement and which optimal modes to operate to conserve energy and consumables (especially within an enclosed environment). The air purifier 104 may be configured to use the input from the sensing device 108 to calculate when the air purifier 104 may go to the power-off/sleep mode so as to provide energy savings. In one embodiment, the air purifier of the present patent application may act as a communications hub for peripheral accessories located in the targeted zone. For example, when the air purifier is disposed in a public rest room and is operatively connected to peripheral accessories such as paper towel dispenser or a toilet paper dispenser, the air purifier is configured to detect when consumables (paper towels, toilet paper) are low.

The controller 106 may be configured to receive the sensor inputs and to determine the motor speed, the air purifier system's noise, the filter usage, the airflow and the servicing needs. The controller 106, based on the sensor inputs, may be also configured to control the motor speed and the purified air output/CFM throughput to achieve desired noise and performance levels.

The air purifier is configured to determine the actual usage of the filtering component and/or the air purifying component so as to prolong the life (and/or replacement) of the filtering component and/or the air purifying component. For example, the air purifier is configured to detect the presence of human in a predetermined area. The air purifier then determines the odor level and the ratings of the air purifier. The air purifier is then configured to run at different speeds based on the determined ratings and odor level. Once the air purifier determined that it cycled the air in the predetermined area a specified number of times, the air purifier then goes to a sleep or an off mode. The filter life count pauses the life count on the filter or filters.

The air purifier 104 includes one or more communication devices 114 coupled to its controller 106 for establishing communication between the controllers 106 of the other air purifiers 104 in the air purifier system 100. The one or more the communication devices 114 may include a receiver for receiving information or signals from one or more controllers 106 of the other air purifiers 104 in the air purifier system 100 and a transmitter for transmitting the information or signals to one or more controllers 106 of the other air purifiers 104 in the air purifier system 100. The receivers and the transmitters of the air purifiers 104 are configured to establish a communication link or communication network between one or more controllers 106 of the air purifiers 104 prior to the transmission of information or signals. The communication network may include any communication network such as the telephone network, wide area network, local area network, Internet or wireless communication network. Examples of wireless communications may include Bluetooth, RF, Wi-Fi, infrared, ultrasonic, or any other wireless connection.

As shown in FIG. 1, each of the controllers 106 is further configured to transmit a control signal CS to each other controller 106 via the communication device 114 in response to its sensing device 108 detecting the change in the one or more conditions in the predetermined area 112. When the controller 106 of one of the air purifiers 104 receives a signal from its sensing device 108 indicating presence of an object (person) in the predetermined area 112 proximate its respective air purifier 104, the controller 106 is configured to change the modes of operation of its air purifier 104 from the first mode of operation to the second mode of operation and the controller 106 is also configured to transmit a control signal CS to each other controller 106 via the communication device 114. In response to receiving the control signal CS, each other controller 106 is further configured to change to the second mode of operation.

As discussed above, the air purifier system 100 includes plurality of air purifiers 104 in the targeted zone 102. When one of the plurality of air purifiers 104 in the targeted zone 102 detects the presence of an object (person or other movable living objects) proximate its respective air purifier 104, its controller 106 change the modes of operation of its air purifier 104 from the first mode of operation to the second mode of operation. However, the person is still able to hear the other air purifiers 104 located in the same targeted zone 102. Therefore, the air purifier system 100 of the present patent application is configured to change modes of operation of some or all of the air purifiers 104 in the targeted zone to the second mode of operation when at least one of the air purifiers 104 detects the presence of a person or other living objects so as to not disturb the people in the targeted zone 102.

The air purifier system 100 of the present patent application may be configured to change modes of operation of all of the other air purifiers 104 in the targeted zone to the quiet mode when at least one of the air purifiers 104 detects the presence of a person or other living objects. The air purifier system 100 of the present patent application may also be configured to change modes of operation of all of the other air purifiers 104 in the targeted zone to the power-off/sleep when at least one of the air purifiers 104 detects the presence of a person or other living objects.

The air purifier system 100 of the present patent application may be configured to change modes of operation of some of the other air purifiers 104 in the targeted zone to the quiet mode and the remaining of the other air purifiers 104 in the targeted zone to the power-off/sleep mode when at least one of the air purifiers 104 detects the presence of a person or other living objects. For example, when the area of the targeted zone is very large so that the person at one end of the targeted zone (and near the detecting air purifier) will not be able to hear some of the other air purifiers 104 located at the other end of the same targeted zone 102, the air purifier system 100 changes modes of operation of some of the other air purifiers 104 located at the other end of the targeted zone to the quiet mode and changes modes of operation of the remaining of the other air purifiers 104 located near the detecting air purifier to the power-off/sleep mode.

For example, in a large, open office space, if a worker is working at his or her desk in just one part of the space, the air purifiers within a certain range (e.g., 20 feet or the closest N number of air purifiers) may be commanded to operate in the same mode as the "master" triggered by that worker. For example, a worker that arrives earlier or stays later than others may benefit from having the nearby purifiers operating in a lower, quieter mode, while the office space as a whole may benefit from having the further away purifiers operate in a higher mode to clean the air.

The decision to change modes of operation of the other air purifiers 104 within the same targeted zone to the second mode of operation may depend on the distance of the other air purifier from the detecting air purifier. For example, the controllers of the air purifiers may include a circuit and/or logic for detecting the strength or intensity of a wireless signal to estimate or detect distance. The decision to change modes of operation of the other air purifiers 104 within the same targeted zone to the second mode of operation may depend on the noise level (in decibels, dB, dBa, or dB(a) or dBA) generated by the other air purifier 104. For example, if the other air purifier is located far away from the detecting air purifier and the other air purifier produces high noise levels, the air purifier system 100 may change modes of operation of that air purifier to the power-off/sleep mode so as to not disturb the people in the targeted zone 102. However, if the other air purifier is located far away from the detecting air purifier and the other air purifier produces low noise levels, the air purifier system 100 may change modes of operation of that air purifier to the quiet mode.

The controller 106 may be configured to sequentially change the modes of operation of all the other air purifiers 104 in a pre-defined order when at least one of the air purifiers 104 detects the presence of a person or other living objects. For example, during installation, the air purifier controllers may be programmed with data indicating which air purifier(s) should "obey" in slave mode.

The information about the noise levels of each of the air purifiers 104 of the air purifier system 100 and the distance between the air purifiers 104 of the air purifier system 100 may be saved in the memory device of each of the controllers 106. It also contemplated that other operational parameters may be considered in making the decision to change modes of operation of the other air purifiers 104 within the same targeted zone to the power-off/sleep mode or to quiet mode.

The controller 106 of the air purifier 104 may be configured to detect incorrect filter media insertion. For example, the controller of the air purifier 104 may be configured to detect when/if the filter media or filtering component is inserted incorrectly. The controller 106 of the air purifier 104 may then send warning signals (visual or audio signals) to the user to indicate incorrect insertion of the filter media so that the user may take appropriate corrective action(s).

As shown in and will be described in detail with respect to FIGS. 3-8, the air purifying sub-system 110 may generally include a drive mechanism or motor 116, a filtering system 118, a fan 120, an air inlet or intake 122 and an air outlet 124.

Figure 4:
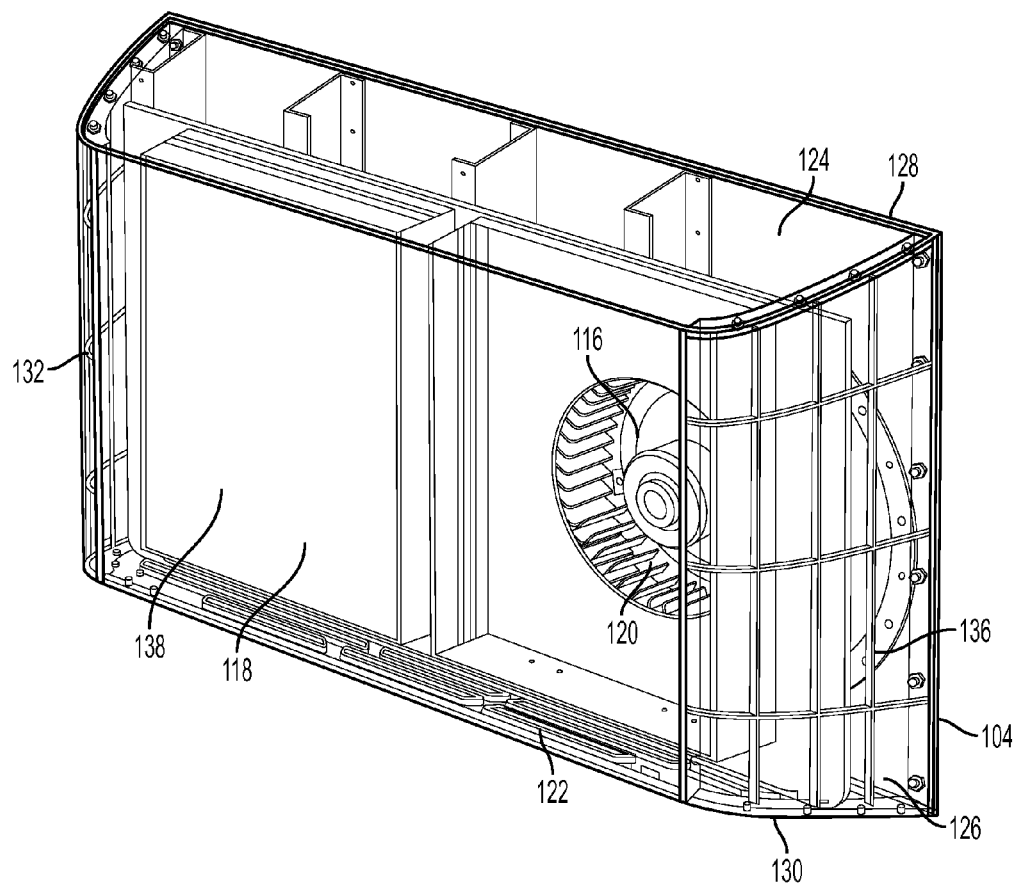
FIGS. 4 and 5 show front and rear perspective views, respectively, of the air purifier of the air purifying system in accordance with an embodiment of the present patent application, where some of the components of the air purifier are not shown for sake of clarity.
Figure 5:
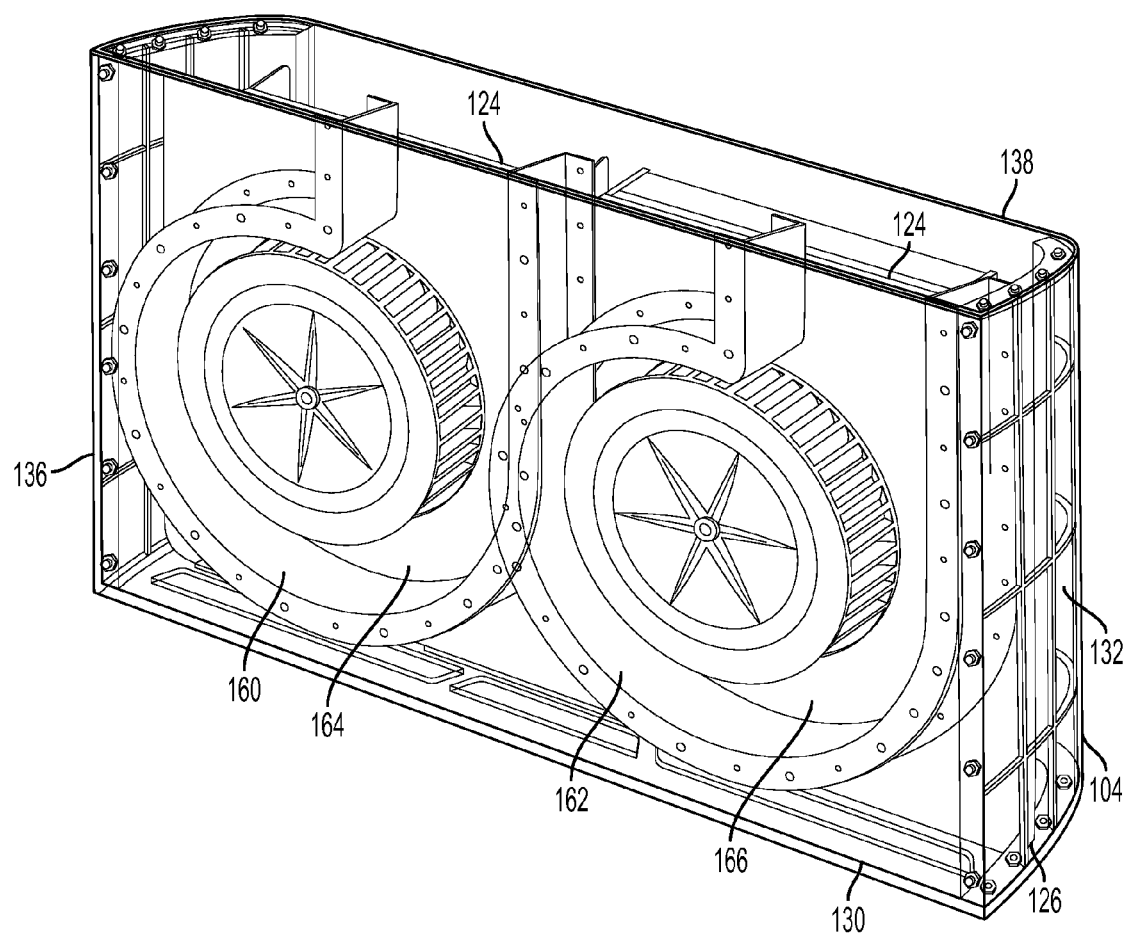
Figure 6:
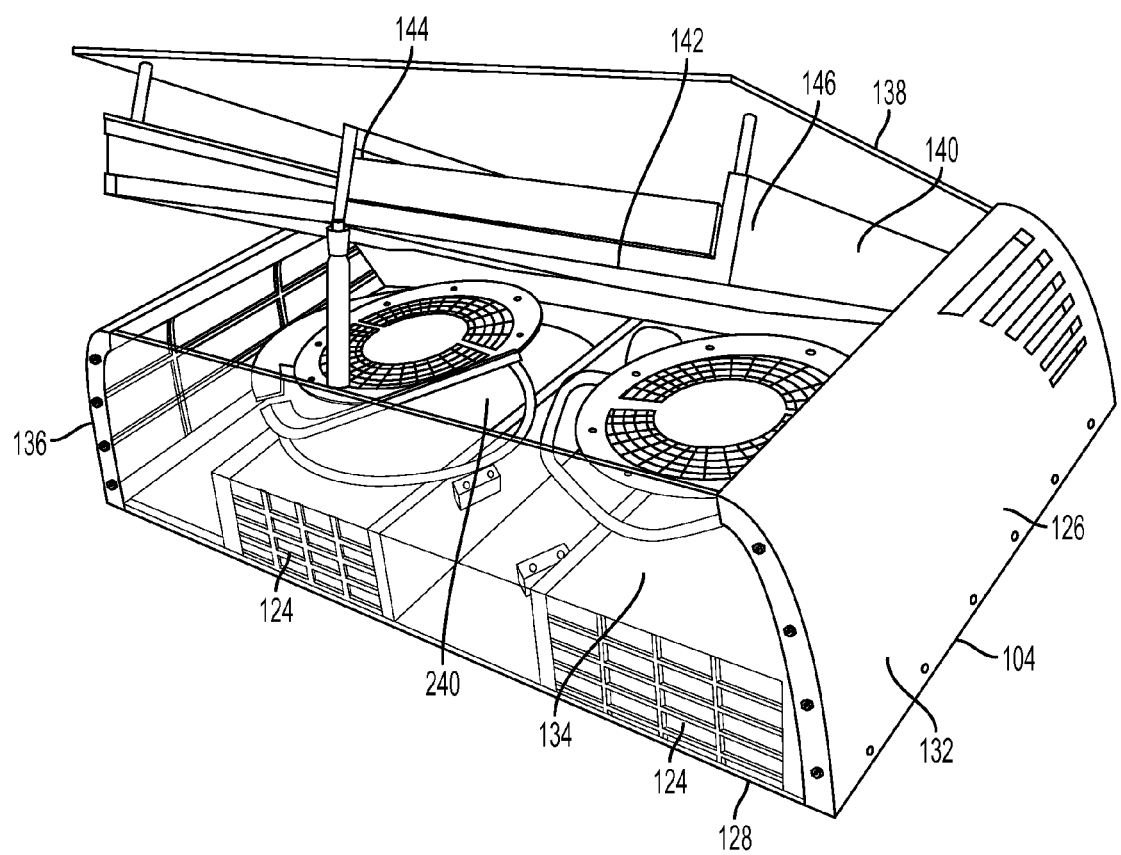
FIGS. 6, 7 and 8 show different views of an exemplary air purifier in accordance with an embodiment of the present patent application, where some of the components of the air purifier are not shown for sake of clarity.

Referring to FIGS. 3-5, the air purifier 104 includes a housing 126. The housing 126 may include a plurality of walls 128, 130, 132, 134, and 136. The plurality of walls 130, 132, 134, and 136 generally extend vertically outwardly from the wall 128. The plurality of walls 130, 132, 134, and 136 form a space with an opening 240 (as shown in FIG. 6) in the housing 126. The housing 126 includes a cover 138 movable between a closed position (as shown in FIGS. 4, 5, 7 and 8) wherein the cover substantially covers the opening 240 and an open position (as shown in FIG. 6) wherein the cover 138 exposes the opening 240. The cover 138 may be pivotally connected to one of the wall 130 of the housing 126 using hinge members. The cover 138 may be secured in the closed position, by at least one latch (not shown). The air purifier 104 may also include a security or vandal resistant lock on a hinged door or filter access panel so as to resist attempts by thieves to gain access to internal compartments of the air purifier. The housing 126 may be formed from a suitable molded plastic material. The housing 126 may be formed from sheet metal material or aluminum material. The housing 126 may be formed from a combination of a plastic material and a metal material.

Also, as shown in and will be described in detail with respect to FIGS. 3-8, the air purifier 104 may include a modular design in which separated airflows, motors and filters (powered and non-powered) may be incorporated into a single air purifier housing in a modular fashion so as to work independently and in tandem with each other by an intelligent control means in response to the air purifier system's sensor inputs. It is contemplated, in accordance with the embodiments of the present patent application, that the air purifier may include the air purifier sub-units to be in a side by side configuration, or in a layered or overlapping configuration. The two or more independent air flow channels may include any type of filtering media and/or purifying components and are operated by a single controller within the air purifier 104.

The housing 126 of the air purifier 104 may include the air inlet 122 and the air outlet 124. The air inlet 122 is configured to receive ambient air and the air outlet 124 is configured to exhaust or deliver purified air. The housing 126 provides an airflow path from the air inlet 122 to the air outlet 124. The air intake/inlet and the air outlet may include a grill.

The airflow pattern of the air purifier 104 is shown in FIG. 3. When installed or mounted on the wall 148 of the targeted zone 102, the air purifier 104 draws air in (as shown by arrow B) from the wall/grill 130, draws air (as shown by arrow S) through lower portions of the walls 132 and 136, and exhausts the purified air (as shown by arrow T) through the wall/grill 134. This airflow pattern of the air purifier 104 enables the air purifier 104 to be wall mounted. Also, this airflow intake and exhaust pattern of the air purifier 104 allows the air purifier 104 not to agitate any flat surfaces and floors in proximity (around and near) to the air purifier and not to send settled viruses and germs air born again. The air purifier 104 exhausts purified air to the breathing level, creates an air flow that drives air to the floor below air breathing level and then draws that air into the air purifier to be purified.

The air filtering system 118 may be provided in the airflow path for filtrating contaminants present in ambient air passing therethrough. The filtering system 118 of the air purifier 104 may include a High-Efficiency Particulate Absorption (HEPA) Filter and a carbon filter. The filtering system 118 of the air purifier 104 may be configured to create an ionized field so as to purify the air. The air purifier 104 may have any type of filter media and/or purification technologies such as Thermodynamic Sterilization technology, Ultraviolet germicidal irradiation technology, HEPA filter, Ultra-Violet Photocatalytic Oxidation (UVPCO) technology, Electrostatic technology, Activated Carbon filter, Photocatalytic Oxidation technology, Titanium dioxide ($TiO_2$) technology, Ionizer purifying technology, Ozone generator technology, etc. For example, the filtering system 118 of the air purifier 104 may include two or more UV-C lamps. The filtering system 118 of the air purifier 104 may include a filter having a Minimum Efficiency Reporting Value (MERV) that generally ranges from about MERV-13+ to MERV-17+. The filtering system 118 of the air purifier 104 may include a granular/granulated (not pellets) activated Carbon filter.

Figure 9:
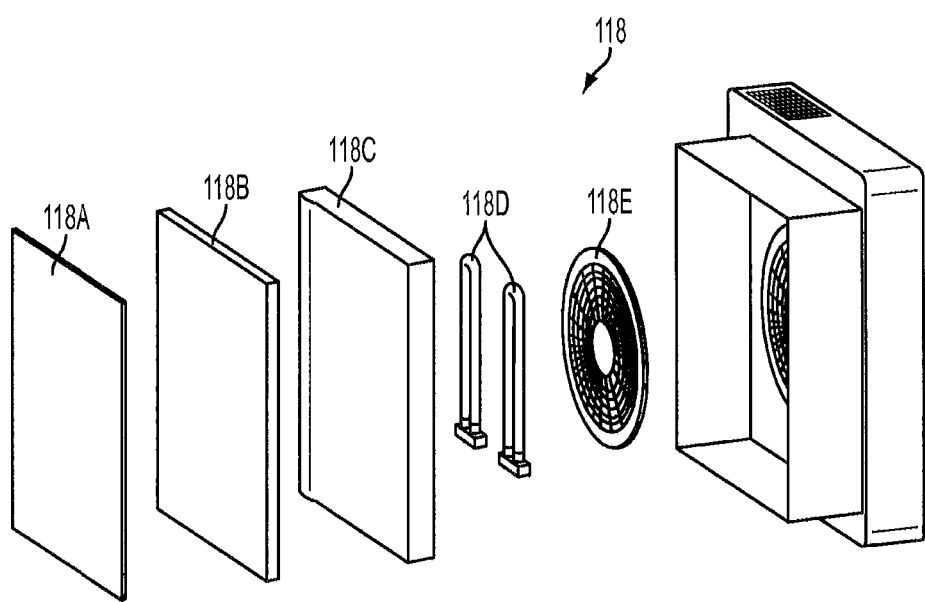
FIG. 9 shows an exploded view of an exemplary filtering system of the air purifier in accordance with an embodiment of the present patent application.

In illustrated embodiment, as shown in FIG. 9, the filtering system 118 of the air purifier 104 may include a pre-filtering component 118A, an activated carbon filtering component 118B, a MERV-13+ filtering component or a True HEPA (MERV-17+) filtering component 118C, two or more UV-C lamps 118D, and a Photocatalytic air purifying component (e.g., $TiO_2$) 118E. The filtering system 118 of the air purifier 104 may also include a plasma (ionizer) air purifying component. The True HEPA filtering component of the filtering system 118 of the air purifier 104 may also include an anti-microbial agent.

Figure 10:
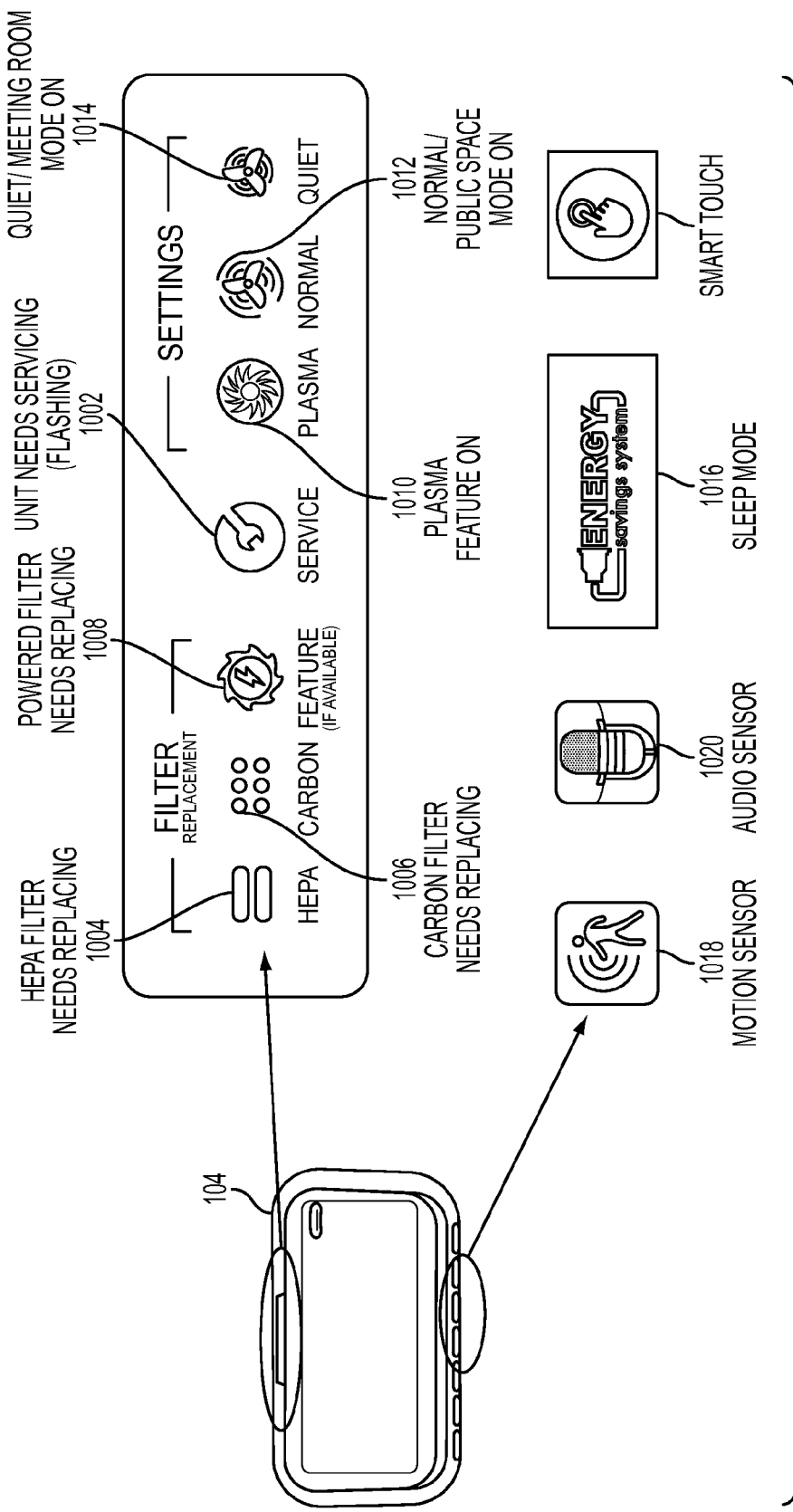
FIG. 10 shows an exemplary user interface of the air purifier in accordance with an embodiment of the present patent application.

The controller 106 of the air purifier 104 may be configured to determine and notify the user by visual, audio signal or any other communications means when servicing of the air purifier (e.g., filter replacement or purifying component replacement is needed) is needed. The air purifier 104 may include a service light 1002 (as shown in FIG. 10) that alerts the user (by flashing or otherwise) that the air purifier is in need of either maintenance or repair. The air purifier 104 may include filter change indicators 1004, 1006, and 1008 (as shown in FIG. 10) that signal the user via the user interface when the HEPA and Carbon filters need replacing. For example, as shown in FIG. 10, the air purifier 104 may include a HEPA filter replacement indicator 1004, a carbon filter replacement indicator 1006, and a Powered filtering component filter replacement indicator 1008. The air purifier 104 may include purifying assembly servicing/maintenance indicators that signal the user via the user interface when purifying assembly need servicing/maintenance. The air purifier 104 may include a sleep mode indicator 1016 to indicate that the air purifier is in a sleep mode. The air purifier 104 may include a motion sensor indicator 1018 to indicate the detection of the object by the motion sensor and an audio sensor indicator 1020 to indicate the detection of the object by the audio sensor. The air purifier 104 may also include odor level indicators that provide feedback to the user regarding the odor level sensed by the odor sensor.

The air purifier 104 may include a Smart Touch feature that provides a touch activated control panel as shown in FIG. 10. In one embodiment, the control panel of FIG. 10 may only accessible by the user when the air purifier's door is open. The features on the control panel of FIG. 10 are direct touch actuated buttons and indicators. In another embodiment, the outer lens (i.e., disposed on the outside of the air purifier's door that opens and closes) is configured to be a capacitive touch panel. When the air purifier's door is in an open position and an interlock switch is activated, the buttons and icons on the Smart Control Panel shown on FIG. 10 are allowed to be actuated by the user. When the air purifier's door is in a closed position and the interlock switch is de-activated, the outer lens is touch activated and is allowed to be actuated by the user for momentary High, Low and Off features (i.e., without having to open the air purifier's door). The user does not have to open the air purifier's door to gain access to the other features shown in FIG. 10. When the air purifier's door is in the closed position, the outer lens may show the warning icons and the odor levels thereon. The interlock switch allows the air purifier unit determine which functions are "active" by its position.

Referring to FIG. 10, the air purifier 104 may include a plasma operation, a normal/public space operation and a meeting room/quiet operation. The quiet operation may include operating the air purifier at reduced noise levels to provide quieter than normal operation of the air purifier when desired. The controller may be configured to receive an operational setting for one of a quiet operation, a normal operation or a plasma operation to be performed by air purifier. The operational setting may be a predetermined setting and may be provided by the user using one or more controls or buttons.

The air purifier 104 may be configured to notify the user by visual indicator about the operational setting the air purifier 104 is in. For example, as shown in FIG. 10, the air purifier 104 may include a plasma operational setting indicator 1010, a normal/public space operational setting indicator 1012, and a meeting room operational setting indicator 1014. In one embodiment, these indicators may include one or more controls or buttons that enable the user to select an operational setting of the air purifier.

When the air purifier 104 is in a normal/public space operational setting, the sensing device of the air purifier 104 detects traffic. Based on the detected traffic, the controller of the air purifier either changes modes of operation of its air purifier from a sleep mode to a normal speed fan operating mode or changes modes of operation of its air purifier from a Turbo speed fan operating mode to a high speed fan operating mode. For example, when the air purifier is in the normal/public space operational setting, the audio sensing device of the air purifier detects the ambient noise levels to determine the presence of human traffic and noise spikes in the targeted area. The sensing device then sends signals, based on the determination, to the controller 106 to operate the air purifier in a particular operating mode. The controller operates the air purifier in a Turbo speed fan operating mode when the sensing device detect that there is no one within proximity of the air purifier 104 or that the targeted zone 102 containing the air purifier 104 is empty.

When the air purifier 104 is in a meeting room operational setting, the sensing device of the air purifier 104 detects traffic. Based on the detected traffic, the controller of the air purifier either changes modes of operation of its air purifier from a sleep mode to a fan operating mode at a desired noise/sound level or changes modes of operation of its air purifier from a Turbo speed fan operating mode to a fan operating mode at a desired noise/sound level. For example, when the air purifier is in the meeting room operational setting, the audio sensing device of the air purifier detects the ambient noise levels to determine the presence of human traffic. The sensing device then sends signals, based on the determination, to the controller to operate in a fan operating mode at a desired noise/sound level. In one embodiment, when the air purifier is in the meeting space/quiet operation setting, it is configured not to operate in Turbo speed fan mode. The controller operates the air purifier in a high speed fan operating mode when the sensing device detect that there is no one within proximity of the air purifier 104 or that the targeted zone 102 containing the air purifier 104 is empty.

For example, the audio sensing device and the controller may be configured to detect the ambient noise levels in a room or a targeted zone to determine presence of traffic and noise spikes and to not exceed the ambient noise levels of the room/targeted zone when the air purifier is on a meeting room setting/quiet setting. When people leave the meeting room or targeted zone, the air purifier detects the lack of motion, resumes normal functionality and is allowed to go to higher speeds.

Figure 7:
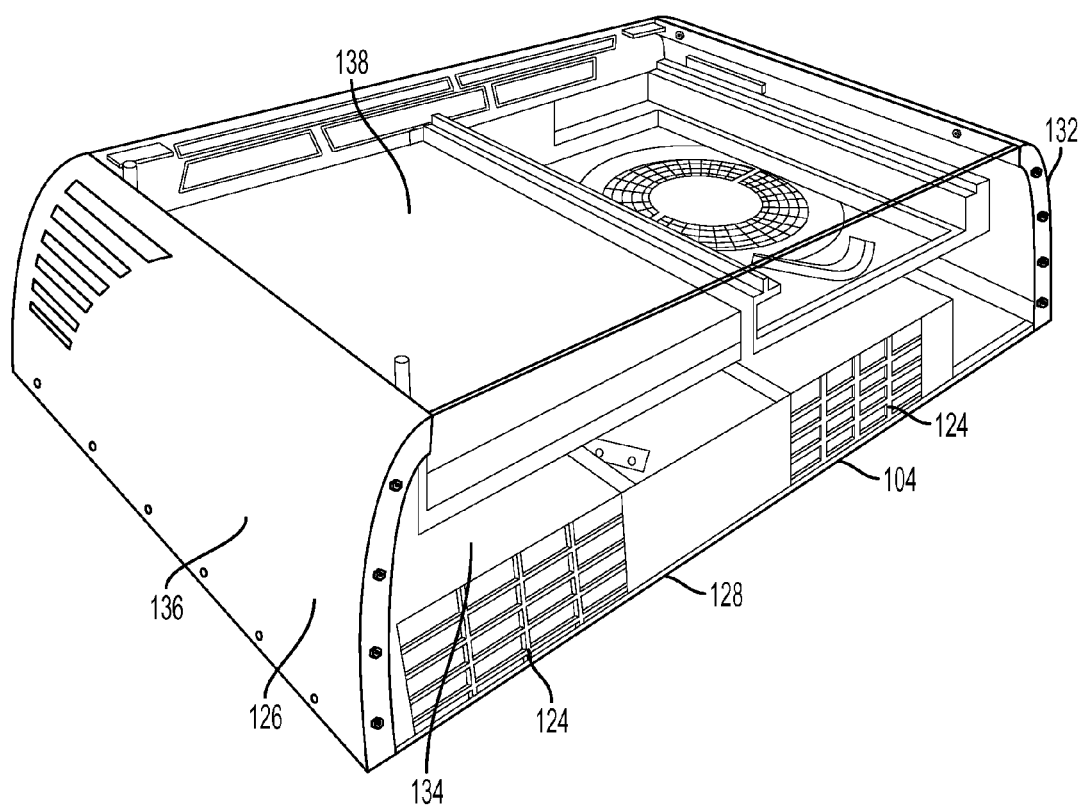
Figure 8:
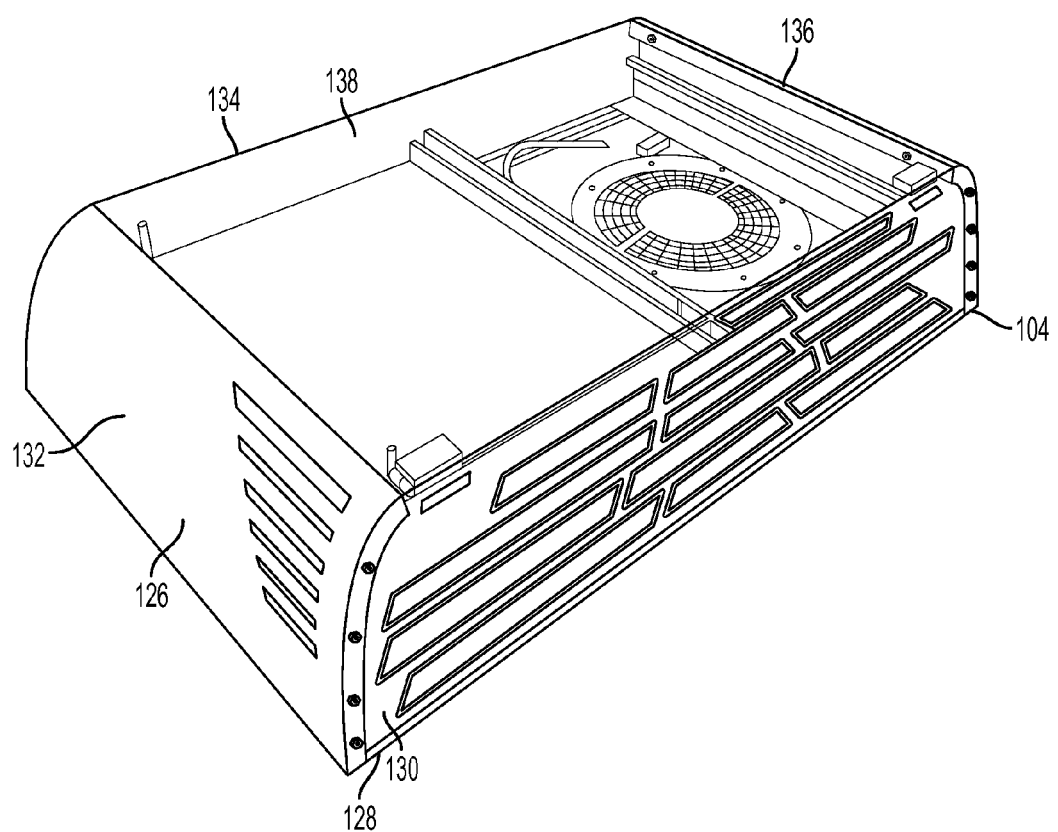

Referring to FIGS. 6-8, the air purifier 104 may include a filter frame assembly 140. The filter frame assembly 140 may be connected to the cover 138 of the air purifier 104 such that the filter frame assembly 140 pivotally moves (with respect to the wall 130 of the housing 126) along with the cover 138. The filter frame assembly 140 includes a support member 142 that has a pair of parallel, opposing guide channel members 144, 146. The channel members 144, 146 define guide tracks to securely receive a filter element therein. The support member 142 may have a two pairs of parallel, opposing guide channel members, each pair defines guide tracks to securely receive a filter element therein.

The air purifier 104 is designed to be easily serviced by a user, a customer or a field technician. For example, the cover or filter door 138 of the air purifier 104 may be configured to open (e.g., forward towards the user) so as to provide easy access to the filter element(s).

The air purifier 104 is configured to sense the presence of the filtering media and purifying component. This allows the controller 106 to determine the optimal operating conditions at any given time by taking into account the various commands and sensor readings. The air purifier 104 is configured to determine the type of filtering media and/or air purifying component that has been inserted (e.g., Carbon, HEPA, combination—powered electrostatic etc.) into the air purifier. For example, reed switches embedded in the air purifier 104 and magnets placed on the filtering components are used to provide a multitude of recognizable configurations to detect the type of filtering media that has been inserted into the air purifier. The reed switches are generally mounted on a Printed Circuit Board (PCB) and assembled into the air purifier unit and the magnets are generally assembled (e.g., by the manufacturer) into the frame of the filters. For example, a HEPA filter may have a magnet placed in a certain location of its frame assembly, while the carbon filter may have a magnet placed in another/different location of its frame assembly. The air purifier unit is configured to determine the type of filter that has been installed. This determination is based on the reed switches of the air purifier unit that have been activated by the magnet(s) on the filter frame assembly. A "code" that includes a combination of the number of magnets and their respective placement on the filter frame assembly may also be used to determine the type of filter that has been installed in the air purifier unit.

Figure 11:
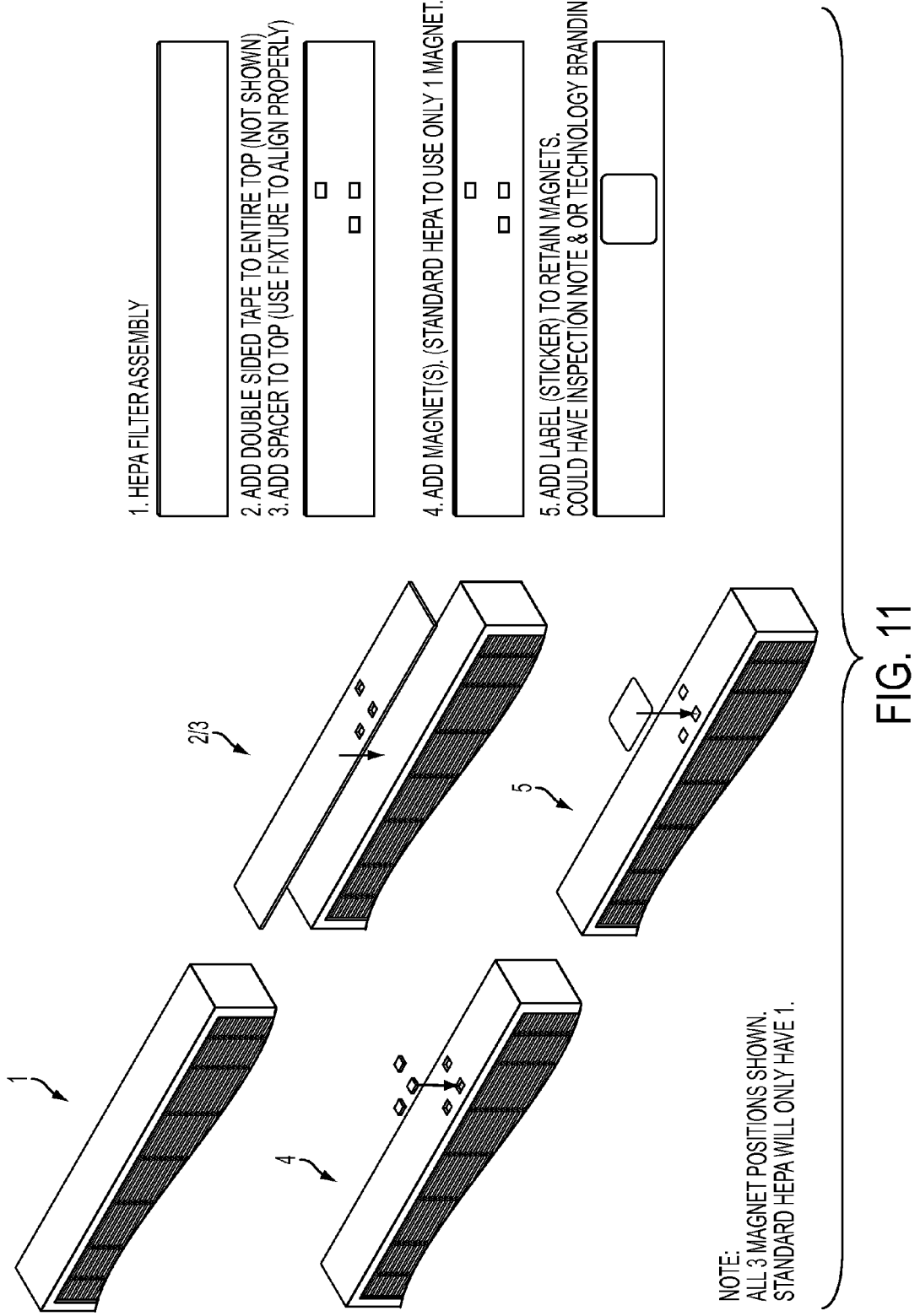
FIG. 11 shows various exemplary recognizable configurations used to detect type of air filtering component used in the air purifier in accordance with an embodiment of the present patent application.

FIG. 11 shows various exemplary recognizable configurations used to detect type of air filtering component used in the air purifier. This filter media recognition feature of the air purifier allows the controller 106 to determine the optimal operating conditions at any given time by taking into account the various other commands and sensor readings.

The fan 120 is configured to move the air through the airflow path between the air inlet 122 and the air outlet 124. The fan of the air purifier 104 may be operated at five different fan speeds. In one exemplary embodiment, the five different fan speeds may include Turbo fan speed at 1150 rpm, High fan speed 730 rpm, Medium fan speed at 575 rpm, Low fan speed at 400 rpm, and Sleep at 0 rpm. The fan of the air purifier 104 may be operated at four different fan speeds. However, the number of fan speeds in the air purifying system 100 can vary significantly in number.

The air purifier 104 may include an air purity or air quality sensor that is configured to monitor the air quality. The air purity or air quality sensor may be configured send an output signal (air quality/purity signal) to the controller. The controller, in response to the received air quality/purity signal from the air purity or air quality sensor, either may automatically adjust the fan speed or may notify the user about the air quality by graphical representation, visual (percentage, number or a changing color), audio signal or any other communications channels.

The drive mechanism (e.g., motor) 116 is configured to provide power to draw air into the air inlet, draw air through the airflow path and deliver/exhaust air out of the air outlet of the housing 126. The drive mechanism 116 may be an electric motor. The motor may be a brushless DC motor. In other embodiment, the drive mechanism includes a battery operated motor or other drive mechanisms that are configured to provide power to draw air into the air inlet, draw air through the airflow path and deliver/exhaust air out of the air outlet of the housing. The drive mechanism 116 may include an output or motor shaft. The fan 120 of the air purifier 104 is mounted to the output shaft to draw air into the air inlet, draw air through the airflow path and deliver/exhaust air out of the air outlet of the housing. The drive mechanism 116 may be connected to a first end of the output or motor shaft and the fan 120 is connected to a second end of the output shaft.

The air purifier 104 may also include a power switch and other electrical contacts for connecting a power cord from a source of electricity for operation of the air purifier 104.

Referring to FIGS. 4-8, the housing 126' of the air purifier 104 may include two air purifier units 104' and 104" in a side by side arrangement within the same housing. Such arrangement generally includes two separated air flow channels, two motors and two fans. The two air purifier side by side arrangement is generally controlled by a user interface and includes a controller that is operatively connected to the motors of the air purifiers and a plurality of sensors.

Figure 5A:
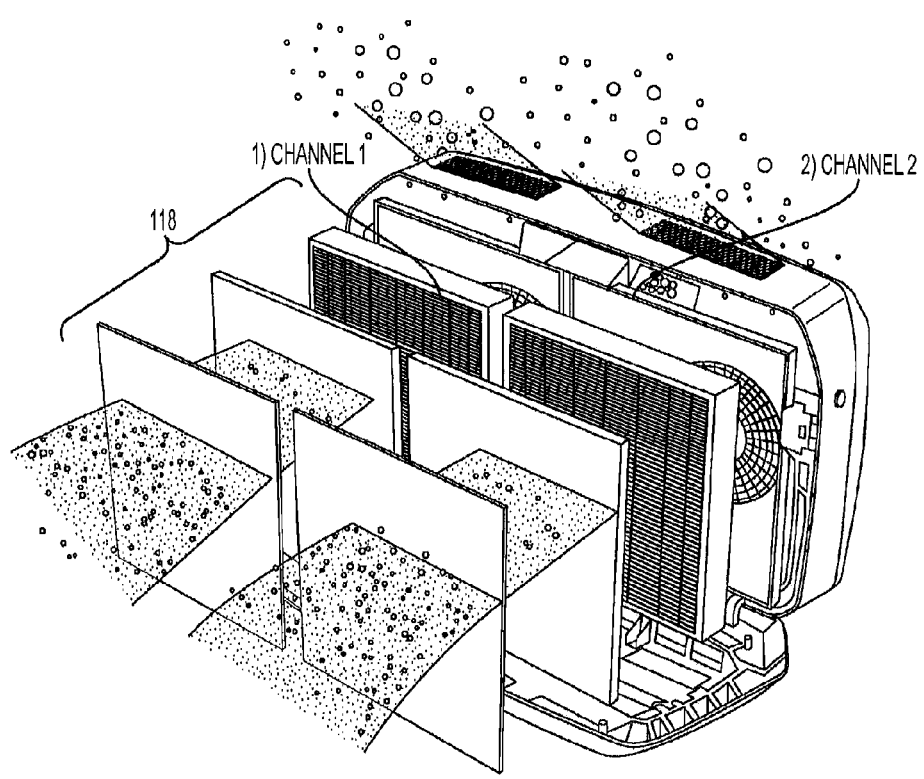
FIG. 5A shows an exemplary air flow pattern through a side by side separated airflow air purifier in accordance with an embodiment of the present patent application.

FIGS. 4 and 5 illustrate a front perspective view and a rear perspective view of the side by side separated airflow air purifier with some of the components removed for sake of clarity. As shown, this unit has two motors and separated filter media. In the illustrated embodiment of FIG. 4, right hand side filter has been removed to show right hand side air purifier's fan, right hand side air purifier's fan blades and right hand side air purifier's motor. In the illustrated embodiment of FIG. 5, ducts 160 and 162 are constructed and arranged to provide separated airflow channels 164 and 166. FIG. 5A illustrates an exemplary air flow pattern through the side by side separated airflow air purifier. This dual air channel air purifier is configured to respond to type of filter (e.g., detected through filter recognition) being inserted into the channel and the operational setting the air purifier is in. For example, a carbon filtering component may be used on one side of the dual air channel air purifier and a HEPA filtering component may be used on the other side of the dual air channel air purifier. When an odor is detected by an odor sensing device of the air purifier 104, the controller of the dual air channel air purifier is configured to enable the motor on the carbon filtering component side to work harder to achieve the desired air quality.

The air purifier arrangement of FIGS. 4 and 5 provides flexibility by using same or different filtering media and/or same or different purification technology in each of the air purifier units 104' and 104". That is, each of the air purifying units 104' and 104" can be configured to a specific filtering media or a specific purification technology in their respective air filter flow channels. The air purifier arrangement of FIGS. 4 and 5 provides flexibility for the user to stack different types of filtering media and/or purifying components into each of the airflow channels so as to specifically target the particular matter the user desires to filter. The volume of air flowing through each of the separate air flow channels and their separate filtering media may be regulated by the controller. The controller takes into consideration the air quality parameters, the room use patterns, the proximity parameters, the motion parameters, the sound parameters, etc. to regulate the flow through the separate air channels so as to filter the room's air properly. Optionally, an access means may be provided in which airflows may be mixed by using a mechanical means such as a motor or solenoid. The controller may be programmed to control such an operation.

Two separate airflow channels regulated by the same controller allows to install a different or enhanced type of air purifying components into one air flow channel and a filtering media into the other airflow channel covering a greater range of purifying components. In another embodiment, a first type of air purifying components are installed into one airflow channel and a second type of air purifying components are installed into the other airflow channel. In yet another embodiment, a first type of filtering media is installed into one airflow channel and a second type of filtering media is installed into the other airflow channel.

The air purifier is configured such that the motor speed may be adjusted depending on the type of filtering media and/or air purifying components inserted into the channel. For example, some carbon filter media may have less resistance than the HEPA filter media so the motor speed (RPM) on the HEPA filter media side may need to be increased to get the proper flow and performance needed for a particular situation and vice versa.

The air purifier 104 also includes a built-in power supply and a power supply fitting/contact rail that is configured to power a modular powered filter unit (such as an electrostatic filter) or an alternative purifying component or assembly such as a UV lamp or UV photo-catalytic unit. That is, the power supply rail of the air purifier 104 allows for the use of powered filter media and powered purifying assembly or components. The air purifier 104 also includes the interlock switch which cuts power to the power-rail or powered contact fitting portion of the air purifier 104.

The air purifier 104 may be constructed and designed to receive modular filters that fit into the air purifier units. The air purifier 104 is constructed and arranged to receive additional purification technologies through the use of powered filters and assemblies that tap into the power supply of the air purifier itself.

The present patent application, thus, provides an air purifier system that is configured to intelligently sense the presence of an object (e.g., people, other foot traffic) by sensing of proximity time and noise levels, and to determine motor speed, air purifier system's noise, filter usage, airflow and servicing needs based on the sensor inputs. The air purifier of the present patent application also has the ability to accept a powered filter media or alternative powered purifying assembly or components. When installed, the air purifier of the present patent application draws air from the bottom portion thereof, cycles the air through the filter media or purifying assembly and exhaust the purified air upwards in such a way that only the filtered or purified air is blown upwards to the face level of the users and the room's surfaces including the floors are not agitated to cause the viruses and germs to get air borne.

Each air purifier, independently if installed in a targeted zone by itself, is configured to detect traffic and the lack thereof using motion and/or audio sensing devices as well the ambient and air purifier sound levels. These sensing devices in cooperation with the controller of the air purifier, filter recognition sensor (for the type of filters installed) and the air purifier's settings determine the air purifier's action to a given set of parameters. These air purifiers may then have unit to unit communication, or a unit to network control.

Also, to save cost and to improve the typical room circulation issues, one of the air purifiers could act as a slave Fan (vs. Air purifier). The slave Fan is configured to push air towards the air purifier and improve the efficiency envelope of the air purifier.

The foregoing illustrated embodiments have been provided to illustrate the structural and functional principles of the present invention and are not intended to be limiting. To the contrary, the present invention is intended to encompass all modifications, alterations and substitutions within the spirit and scope of the appended claims.

What is claimed is:

1. An air purifying system comprising:
a plurality of air purifiers, each of the air purifiers having a controller and a sensor, wherein the air purifiers of the air purifying system are physically separate and spaced-apart from one another, wherein each sensor is configured to detect one or more conditions in a predetermined area proximate its respective air purifier;
each of the plurality of air purifiers includes a fan and a drive mechanism configured to operate the fan to move air through its respective air purifier and each of the plurality of air purifiers is configured to operate in at least one of a plurality of modes of operation;
each controller includes one or more processors and is configured to change the mode of operation of its respective air purifier from a first mode of operation to a second mode of operation in response to its respective sensor detecting a change in said one or more conditions in the predetermined area;
each of said air purifiers comprising one or more communication devices coupled to the controller thereof for establishing communication between the controllers of said air purifiers;
each of said controllers is further configured to transmit a control signal to each other controller via said communication device in response to its respective sensor detecting said change, wherein each controller is further configured to change to said second mode of operation in response to receiving said control signal.

2. The air purifying system of claim 1, wherein the sensor includes one or more of a motion sensor, a light sensor, a laser sensor, a temperature sensor, an audio sensor, a radiation sensor, an Infrared (IR) beam sensor, and a proximity sensor that is configured to detect one or more conditions in the predetermined area proximate its respective air purifier.

3. The air purifying system of claim 1, wherein the one or more conditions include motion, light (visible or non-visible), radiation, temperature, acceleration, Radio Frequency (RF) signals, sound waves, and Infrared (IR) signals in the predetermined area.

4. The air purifying system of claim 1, wherein the first mode of operation includes a high performance mode.

5. The air purifying system of claim 1, wherein the second mode of operation includes a power-off mode.

6. The air purifying system of claim 1, each air purifier is configured to be mounted on a surface of a targeted zone.

7. The air purifying system of claim 1, wherein the plurality of air purifiers are disposed in a targeted zone, and wherein the targeted zone is a closed or a semi-closed defined space.

8. The air purifying system of claim 1, each air purifier has a housing that is configured to receive a plurality of air purifier sub-units.

9. The air purifying system of claim 8, wherein each air purifier sub-unit has a motor, a fan and an air flow channel, and wherein each air flow channel is configured to receive different types of air filtering media, different types of air purifying components, or different types of air filtering media and air purifying components to specifically target particular matter a user desires to filter.

10. The air purifying system of claim 8, the housing of each air purifier is configured to receive two air purifier sub-units.

11. The air purifying system of claim 1, wherein the sensor includes an air quality sensor that is configured to monitor the air quality in the predetermined area proximate its respective air purifier and a presence or motion sensor that is configured to sense the presence or movement of the object in the predetermined area proximate its respective air purifier.

12. The air purifying system of claim 11, wherein the presence or motion sensor is configured to sense the presence or movement of the object in the predetermined area via sound or heat generated by the object.

13. The air purifying system of claim 1, wherein each air purifier is configured to receive different types of filtering media, different types of air purifying components, or different types of air filtering media and air purifying components, to determine the type of filtering media, the type of air purifying components or the type of air filtering media and air purifying components that has been inserted into the air purifier, and to adjust its operation based on the type of filtering media, the type of air purifying components or the type of air filtering media and air purifying components that has been inserted therein.

14. An air purifying system comprising:
a plurality of air purifiers, each of the air purifiers having a controller and a sensor, wherein each sensor is configured to detect one or more conditions in a predetermined area proximate its respective air purifier;
each of the plurality of air purifiers includes a fan and a drive mechanism configured to operate the fan to move air through its respective air purifier and each of the plurality of air purifiers is configured to operate in at least one of a plurality of modes of operation;
each controller includes one or more processors and is configured to change the mode of operation of its respective air purifier from a first mode of operation to a second mode of operation in response to its respective sensor detecting a change in said one or more conditions in the predetermined area;
each of said air purifiers comprising one or more communication devices coupled to the controller thereof for establishing communication between the controllers of said air purifiers;
each of said controllers is further configured to transmit a control signal to each other controller via said communication device in response to its respective sensor detecting said change, wherein each controller is further configured to change to said second mode of operation in response to receiving said control signal, wherein the plurality of modes of operation include a high performance mode, a quiet mode and a power-off mode.

15. The air purifying system of claim 14, wherein the second mode of operation includes the quiet mode.

16. An air purifying device comprising:
- an air purifier mechanism received in a housing, the housing providing an air flow path between an air inlet configured to receive ambient air and an air outlet configured to deliver purified air;
- the air purifier mechanism includes an air purifying system, a fan and a drive mechanism, the air purifying system is disposed in the air flow path and is configured to remove contaminants present in the ambient air passing through the housing, the drive mechanism is configured to drive the fan at variable speeds to move the air through the air flow path between the air inlet and air outlet;
- a controller having a plurality of predetermined operational settings to govern operation of the air purifier mechanism, the controller comprising one or more processors and being configured to receive an input to select one of the predetermined operational settings to govern the operation of the air purifier mechanism; and
- a sensor disposed in or on the housing of the air purifying device, the sensor being configured to monitor one or more conditions in a predetermined area proximate the air purifying device to detect presence or movement of an object in the predetermined area;
- wherein the air purifier mechanism is configured to operate in at least one of a plurality of modes of operation for each of the air purifier mechanism's predetermined operational settings;
- wherein the controller is configured to select a mode of operation from the plurality of modes of operation of the air purifier mechanism based on the selected predetermined operational setting selected based on the received input and in response to its respective sensor detecting the presence or movement of the object in the predetermined area, and wherein the predetermined operational setting determines which of the plurality of modes of operation may be selected.

17. The air purifying device of claim 16, wherein the predetermined operational settings may include one of a normal operation, a quiet operation, or a plasma operation to govern the operation of the air purifier mechanism.

18. The air purifying device of claim 16, wherein the air purifying system includes one or more air filtering components, one or more air purifying components, or one or more air filtering components and air purifying components.

19. The air purifying device of claim 18, wherein the sensor is further configured to detect a type of air filtering components, a type of air purifying components, or a type of air filtering components and air purifying components in the air purifying system.

20. The air purifying device of claim 19, wherein the controller is configured to select the mode of operation from the plurality of modes of operation of the air purifier mechanism in response to the detected type of air filtering components detected by the sensor, the detected type of air purifying components detected by the sensor, or to the detected type of air filtering components and air purifying components detected by the sensor.

21. The air purifying device of claim 16, wherein the sensor includes one or more of a motion sensor, a light sensor, a laser sensor, a temperature sensor, an audio sensor, a radiation sensor, an Infrared (IR) beam sensor, and a proximity sensor device that is configured to detect one or more conditions in the predetermined area proximate its respective air purifying device.

22. The air purifying device of claim 16, wherein the one or more conditions include motion, light (visible or non-visible), radiation, temperature, acceleration, Radio Frequency (RF) signals, sound waves, and Infrared (IR) signals in the predetermined area.

23. The air purifying device of claim 16, wherein the air purifying device is configured to be mounted on a surface of a targeted zone.

24. The air purifying device of claim 16, wherein the air purifying device has a housing that is configured to receive a plurality of air purifier sub-units.

25. The air purifying device of claim 24, wherein each air purifier sub-unit has a motor, a fan and an air flow channel, and wherein each air flow channel is configured to receive different types of air filtering media, different types of air purifying components, or different types of air filtering media and air purifying components to specifically target particular matter a user desires to filter.

26. The air purifying device of claim 24, wherein the housing of the air purifying device is configured to receive two air purifier sub-units.

27. The air purifying device of claim 16, wherein the sensor includes an air quality sensor that is configured to monitor the air quality in the predetermined area and a presence or motion sensor that is configured to sense the presence or movement of the object in the predetermined area, and wherein the controller is configured to select the mode of operation from the plurality of modes of operation of the air purifier mechanism based on the selected predetermined operational setting and based on its respective sensor detecting the presence or movement of the object in the predetermined area and the air quality monitored in the predetermined area.

28. The air purifying device of claim 27, wherein the presence or motion sensor is configured to sense the presence or movement of the object in the predetermined area via sound or heat generated by the object.

29. An air purifying device comprising:
- an air purifier mechanism received in a housing, the housing providing an air flow path between an air inlet configured to receive ambient air and an air outlet configured to deliver purified air;
- the air purifier mechanism includes an air purifying system, a fan and a drive mechanism, the air purifying system is disposed in the air flow path and is configured to remove contaminants present in the ambient air passing through the housing, the drive mechanism is configured to drive the fan at variable speeds to move the air through the air flow path between the air inlet and air outlet;
- a controller having a plurality of predetermined operational settings to govern operation of the air purifier mechanism, the controller comprising one or more processors and being configured to receive an input to select one of the predetermined operational settings to govern the operation of the air purifier mechanism; and
- a sensor disposed in or on the housing of the air purifying device, the sensor being configured to monitor one or more conditions in a predetermined area proximate the air purifying device to detect presence or movement of an object in the predetermined area;
- wherein the air purifier mechanism is configured to operate in at least one of a plurality of modes of operation for each of the air purifier mechanism's predetermined operational settings;
- wherein the controller is configured to change the mode of operation of the air purifier mechanism from a first mode of operation to a second mode of operation in response to its respective sensor detecting the presence or movement of the object in the predetermined area and based on the selected predetermined operational setting, wherein the plurality of modes of operation include a high performance mode, a quiet mode and a power-off mode.

30. An air purifying device comprising:
an air purifier mechanism received in a housing, the housing providing an air flow path between an air inlet configured to receive ambient air and an air outlet configured to deliver purified air;
the air purifier mechanism includes an air purifying system, a fan and a drive mechanism, the air purifying system is disposed in the air flow path and is configured to remove contaminants present in the ambient air passing through the housing, the drive mechanism is configured to drive the fan at variable speeds to move the air through the air flow path between the air inlet and air outlet, wherein the air purifier mechanism is configured to operate in at least one of a plurality of modes of operation;
a sensor disposed in or on the housing of the air purifying device, the sensor including a presence or motion sensor configured to detect presence or movement of an object in an predetermined area proximate the air purifying device and an air quality sensor configured to monitor the air quality in the predetermined area; and
a controller comprising one or more processors and being configured to change modes of operation of the air purifier mechanism from a first mode of operation to a second mode of operation based on its respective sensor detecting the presence or movement of the object in the predetermined area and the air quality monitored in the predetermined area.

31. The air purifying device of claim 30, wherein the first mode of operation includes a high performance mode.

32. The air purifying device of claim 30, wherein the second mode of operation includes a quiet mode.

33. The air purifying device of claim 30, wherein the second mode of operation includes a power-off mode.

34. The air purifying device of claim 30, wherein the plurality of modes of operation include a high performance mode, a quiet mode and a power-off mode.

35. The air purifying device of claim 30, wherein the air purifier mechanism is configured to receive different types of filtering media, different types of air purifying components, or different types of air filtering media and air purifying components, to determine the type of filtering media, the type of air purifying components or the type of air filtering media and air purifying components that has been inserted into the air purifier mechanism, and to change the modes of operation of the air purifier mechanism from the first mode of operation to the second mode of operation based on the type of filtering media, the type of air purifying components or the type of air filtering media and air purifying components that has been inserted therein.

* * * * *